May 28, 1963 A. W. MASSMAN 3,091,659
TELEVISION RECEIVER WITH TRANSISTORIZED VIDEO AMPLIFIER
Filed Feb. 27, 1961
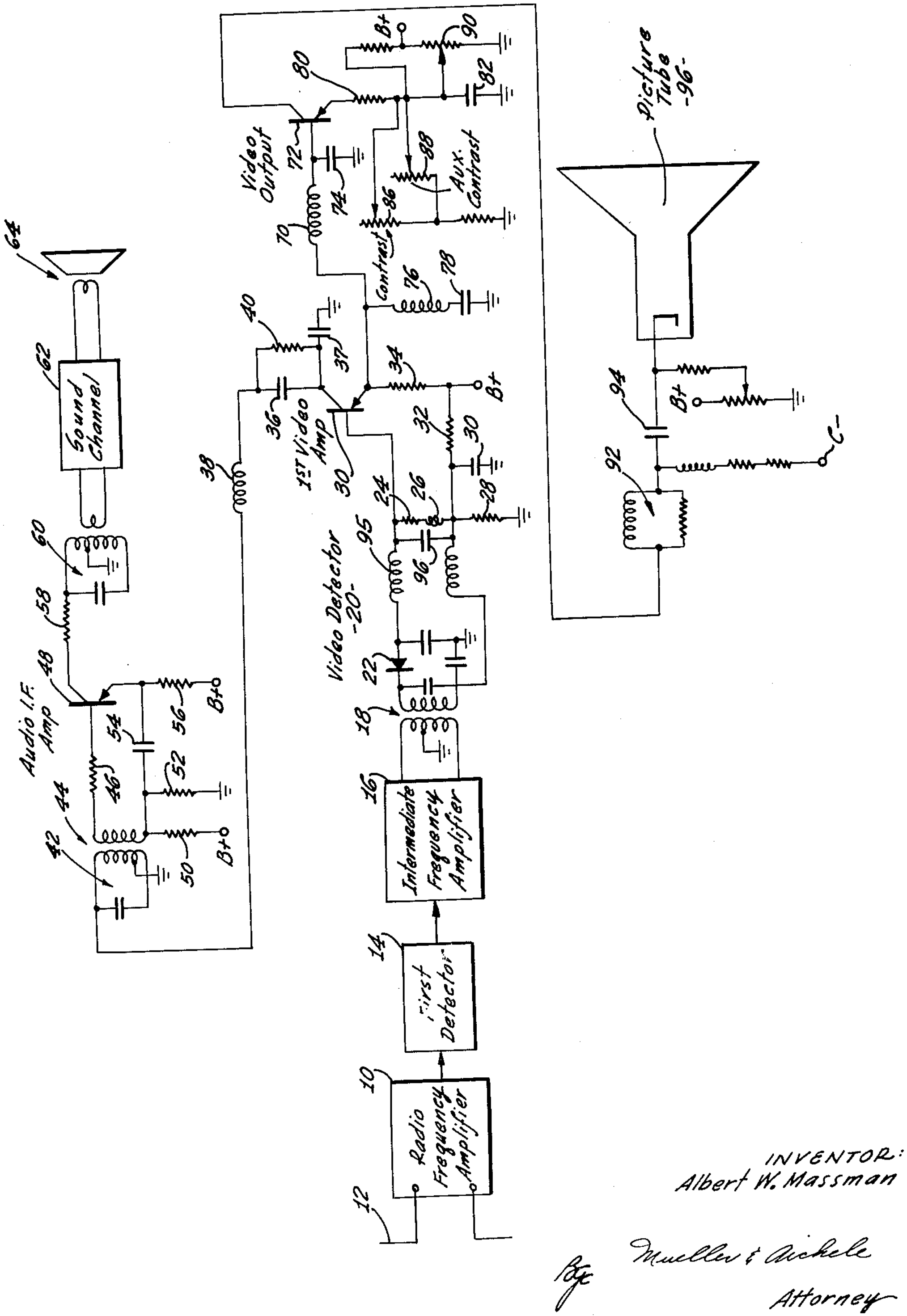
INVENTOR:
Albert W. Massman
By Mueller & Aichele
Attorney United States Patent Office 3,091,659

Patented May 28, 1963

3,091,659

TELEVISION RECEIVER WITH TRANSISTORIZED VIDEO AMPLIFIER

Albert W. Massman, Wheaton, Ill., assignor to Motorola, Inc., Chicago, Ill., a corporation of Illinois Filed Feb. 27, 1961, Ser. No. 91,956

5 Claims. (Cl. 178—5.8)

The present invention relates generally to amplifiers, and it relates more particularly to an improved transistorized video amplifier for use in a television receiver.

As is well known, the present-day television signal is standardized to include an amplitude modulated video carrier and a frequency modulated sound carrier, these carriers being frequency displaced from one another. Both the video carrier and the sound carrier are amplified in a common radio frequency amplifier and in a common intermediate frequency amplifier of the television receiver, and both carriers are detected in a video detector of the receiver. The video detector produces video signals extending through a particular frequency range, and it also produces an inter-carrier sound signal which is displaced in frequency from the frequency range of the detected video signals and which is frequency modulated by the audio intelligence.

The detected video signals from the video detector are amplified in the video amplifier, and they are applied to the picture tube of the television receiver to control the intensity of the cathode-ray beam therein in accordance with the video intelligence. The frequency modulated inter-carrier sound signal is introduced to the audio channel of the receiver for subsequent amplification and reproduction of the sound intelligence.

An object of the present invention is to provide a transistorized stage in a television receiver which functions efficiently to pass the detected video signals to the video channel of the television receiver for subsequent video reproduction, and which also serves in an improved manner to pass the inter-carrier sound signal to the audio channel of the television receiver for subsequent sound reproduction.

A more general object of the invention is to provide an amplifier which is capable of responding to frequency displaced signals, and of efficiently and selectively introducing the signals to individual output channels.

Another object of the invention is to provide a transistorized amplifier stage for use in a television receiver and which is capable of efficiently directing the inter-carrier sound signal to the sound channel of the receiver and the video signals to the video channel of the receiver, and which amplifier is simple in its construction so as to be practically and commercially feasible.

A feature of the invention is the provision of an improved transistorized video amplifier adapted to be intercoupled between the video detector and video output amplifier of a television receiver and which functions as an impedance matching network in the frequency range of the detected video signals so as to provide an efficient coupling from the video detector to the video output amplifier; and which is further coupled to the sound intermediate frequency amplifier of the television receiver to function as a selective amplifier at the frequency of the inter-carrier sound signal, so that the inter-carrier sound signal may be introduced in amplified form to the sound channel of the television receiver.

A further feature of the invention is the provision of such an improved transistorized video amplifier which presents a relatively high impedance to the video detector of the television receiver so as to obviate excessive loading of the video detector, and which presents a relatively low output impedance to drive the video output stage of the television receiver.

The above and other features of the invention which are believed to be new are set forth with particularity in the claims. The invention itself, however, may be best understood by reference to the following description in conjunction with the accompanying drawing in which the single FIGURE represents a television receiver, partly in block form and partly in circuitry, the receiver including an improved transistorized video amplifier constructed in accordance with the concepts of the present invention, and representing an embodiment of the invention.

The television receiver illustrated in the accompanying drawing includes a radio frequency amplifier 10 which may have one or more stages, and which may be constructed in known manner. The radio frequency amplifier 10 has input terminals connected to a suitable antenna 12, and it has output terminals coupled to a first detector 14. The first detector 14 may also be of usual construction, and it is coupled to an intermediate frequency amplifier 16. The intermediate frequency amplifier 16 may have one or more stages.

The intermediate frequency amplifier 16 is coupled through a coupling transformer 18 to the video detector 20 of the receiver. The video detector includes a diode 22 and associated circuitry. The associated circuitry includes a load resistor 24 and an inductance coil 26 connected in series across the output terminals of the detector circuit. The resistor 24 may have a resistance, for example, of 5.6 kilo-ohms, and the inductance coil 26 may have an inductance of 8.5 mircohenries. The inductance coil 26 is connected to a resistor 28 which is shunted by a capacitor 30. The resistor 28 is connected to a point of reference potential, such as ground, and it may have a resistance of 1 kilo-ohm. The capacitor 30 may have a capacity of .001 microfarad, for example.

The resistor 24 is connected to the base electrode of a PNP transistor 30, and the junction of the inductance coil 26 and resistor 28 is connected through a pair of resistors 32 and 34 to the emitter of the transistor 30. The resistor 32 may have a resistance of 220 ohms, for example, and the resistor 34 may have a resistance of 560 ohms. The junction of the resistors 32 and 34 is connected to the positive terminal B+ of an appropriate source of unidirectional potential, the negative terminal of the source being connected to a point of reference potential, such as ground.

The transistor 30 is connected as a first video amplifier for the television receiver, and this video amplifier is constructed in accordance with the concepts of one embodiment of the present invention. The collector of the transistor 30 is connected to a capacitor 36 and to a capacitor 37. The capacitor 36 may have a capacity of .01 microfarad, for example; and it is shunted by a resistor 40 which may, for example, have a resistance of 680 ohms. The capacitor 37 is connected to the point of reference potential, and it may have a capacity of 18 micromicrofarads, for example.

The capacitor 36 is coupled through an inductance coil 38 to one side of a parallel resonant network 42. The inductance coil 38 may have an inductance of 6 microhenries, for example. The resonant network 42 includes a capacitor shunted across an inductance coil, a selected tap on the inductance coil being connected to the point of reference potential, such as ground, and the inductance coil forming the primary of a coupling transformer 44.

The secondary of the coupling transformer 44 is coupled through a resistor 46 to the base of a PNP transistor 48. The resistor 46 may have a resistance of 22 ohms, for example. The transistor 48 is connected as an audio intermediate frequency amplifier for the television receiver. The other side of the secondary of the transformer 44 is connected to the junction of a pair of resistors 50 and 52. The resistor 50 may have a resistance of 2.7 kilo-ohms, for example, and it is connected to the positive terminal B+ of the source of unidirectional potential. The resistor 52 may have a resistance of 1 kilo-ohm, and it is connected to the point of reference potential.

The junction of the resistors 50 and 52 is connected through a capacitor 54 to the emitter of the transistor 48, and the emitter is connected through a resistor 56 to the positive terminal B+. The capacitor 54 may have a capacity of .01 microfarads, for example, and the resistor 56 may have a resistance of 3.3 kilo-ohms.

The collector of the transistor 48 is connected through a resistor 58 to a tuned output circuit 60, and the output circuit is coupled to the sound channel 62 of the receiver. The sound channel 62 may include the usual audio detector, driver and output stages, and it is coupled to a usual sound reproducer 64.

The emitter of the transistor 30 in the first video amplifier is coupled through an inductance coil 70 to the base of a PNP transistor 72. The latter transistor is included in the video output stage of the receiver, and its base is connected to a capacitor 74. The coil 70 may have an inductance of 6 microhenries, and the capacitor 74 may have a capacity of 33 micromicrofarads, this capacitor being connected to the point of reference potential. The emitter is also connected to a series resonant network including an inductance coil 76 and a series connected capacitor 78. The inductance coil may have an inductance of 2.1 microhenries, and the capacitor may have a capacity of 82 micromicrofarads, the capacitor being connected to the point of reference potential, such as ground.

The emitter of the transistor 72 is connected through a resistor 80 to a capacitor 82. The resistor 80 may have a resistance of 47 ohms, for example, and the capacitor 82 may have a capacity of 500 microfarads. The capacitor 82 is connected to the point of reference potential. The junction of the resistor 80 and the capacitor 82 is connected to the slider of a contrast control 86, an auxiliary contrast control 88 and an automatic gain control potentiometer 90. The collector of the transistor 72 is connected through a peaking network 92, and through a coupling capacitor 94 to the cathode of the picture tube 96 of the receiver.

Other usual circuitry is included in the coupling between the transistor 72 and the picture tube which forms no part of the present invention. The sweep and synchronizing portions of the television receiver, likewise, form no part of the present invention and have not been shown.

When the television receiver is tuned to a particular television signal, the signal is intercepted by the antenna 12 and amplified by the radio frequency amplifier 10. The amplified radio frequency signal from the amplifier 10 is heterodyned by the first detector 14 to the selected intermediate frequency of the receiver. The resulting intermediate frequency signal is amplified by the intermediate frequency amplifier 16 and is introduced to the video detector 20 for detection. The video detector produces across its load resistor 24 the detected video signals, and it also produces the frequency modulated 4.5 megacycle inter-carrier sound signal. These signals are passed by the first video amplifier 30 in a manner to be described. The first video amplifier introduces the inter-carrier sound signal to the audio intermediate frequency amplifier of the transistor 48 for amplification, and for subsequent detection and reproduction in the sound channel 62. The amplifier 30 also passes the detected video signals to the video output amplifier of the transistor 72 for amplification and for introduction to the cathode of the picture tube 96.

The resistors 28 and 32 serve as a voltage divider to provide the proper forward bias for the transistor 30 in the first video amplifier. The inductance coil 95 and capacitor 96 serve as a by-pass for the intermediate frequency signals and prevent these signals from reaching the video circuits; and these elements also prevent harmonics of these signals from reaching the input circuit which would cause interference patterns.

The first video amplifier 30, in accordance with the invention, performs a dual function. In the frequency range of the detected video signals, for example, the collector circuit of the transistor 30 is maintained essentially at the potential of the point of reference potential. This is achieved by the tuned circuit 42. This tuned circuit is a parallel resonant circuit, and it is tuned to the frequency of the inter-carrier sound signal, that is, to 4.5 megacycles. At the frequency of the video signals, the resonant network 42 presents a relatively low impedance to the point of reference potential, so that the collector of the transistor 30 is maintained essentially at the potential of the point of reference potential in the frequency range of the video signals.

The series-resonant circuit 76, 78 is also tuned to the 4.5 megacycle frequency of the inter-carrier sound signal. The series-resonant circuit formed by the inductance coil 70 and capacitor 74 filters any IF signal that can cause interference with the demodulated signal.

Therefore, in the frequency range of the detected video signals, the first video amplifier of the transistor 30 functions as a common collector amplifier, and it exhibits characteristics similar to a cathode follower. That is, the first video amplifier serves to introduce the detected video signals to the video output amplifier 72 to the exclusion of the inter-carrier sound signal; and it also serves to present a high impedance to the second detector so as to prevent excessive loading of the second detector, and to present a low output driving impedance for the video output amplifier 72.

At the 4.5 megacycle frequency of the inter-carrier sound signal, on the other hand, the first video amplifier 30 functions as a common emitter amplifier. At that frequency, the traps 76, 78 present a relatively low impedance so that the emitter of the transistor 30 is established and is substantially the potential of the reference potential point. The inter-carrier sound signal is, therefore, amplified by the first video amplifier and applied through its collector circuit to the sound channel of the receiver, to the exclusion of the video signals.

The invention provides, therefore, an improved video amplifier which serves a dual function, efficiently to separate and amplify the inter-carrier sound signal from the detected video signals to introduce the sound signal in amplified form to the sound channel of the receiver; and also to separate the video signals from the inter-carrier sound signal, and to provide an impedance matching network for the video frequency signals between the video detector and the video output amplifier of the receiver.

What is claimed is:

1. In a television receiver for utilizing a television signal having a video carrier amplitude modulated by video signals and a sound carrier frequency displaced from said video carrier and frequency modulated by audio signals, which television receiver includes a detector for producing detected video signals in a particular frequency range and for further producing an inter-carrier sound signal frequency displaced from said range and frequency modulated by the audio signals, and which further includes an audio channel and a video channel, the combination of: a video amplifier coupled to said detector and including a transistor having a first electrode coupled to said detector and further having a second electrode and a third electrode, first circuit means coupling said second electrode to said audio channel and including resonant network means coupled to a point of reference potential for establishing said second electrode substantially at the potential of said point of reference potential in the frequency range of said video signals, and second circuit means coupling said third electrode to said video channel and including resonant network means coupled to said point of reference potential for establishing said third electrode substantially at the potential of said point of reference potential at the frequency of said inter-carrier sound signal.

2. In a television receiver for utilizing a television signal having a video carrier amplitude modulated by audio signals and a sound carrier frequency displaced from said video carrier and frequency modulated by audio signals, which includes a detector for producing detected video signals in a particular frequency range and for further producing an inter-carrier sound signal frequency displaced from said range and frequency modulated by the audio signals, and which further includes an audio channel and a video channel, the combination of: a video amplifier coupled to said detector and including a transistor having a base electrode and an emitter electrode and a collector electrode, input circuit means coupled to said base electrode for coupling said detector to said video amplifier, first output circuit means coupled to said collector electrode for coupling said video amplifier to the audio channel and including resonant network means coupled to a point of reference potential for establishing said collector electrode substantially at the potential of said point of reference potential in the frequency range of said video signals, and second output circuit means coupled to said emitter electrode for coupling said video amplifier to the video channel and including resonant network means coupled to said point of reference potential for establishing said emitter electrode substantially at the potential of said point of reference potential at the frequency of said inter-carrier signal.

3. The combination defined in claim 3 and in which said resonant network means in said first output circuit means includes a parallel resonant network adapted to be tuned to the frequency of said inter-carrier sound signal.

4. The combination defined in claim 2 and in which said resonant network means in said second output circuit means includes a series resonant network adapted to be tuned to the frequency of said inter-carrier sound signal.

5. In a television receiver for utilizing a signal having a modulated video carrier and a modulated sound carrier, the combination of a video amplifier including a transistor having first, second and third electrodes, means for applying the television signal to said first electrode with respect to a reference potential, circuit means connected to said second electrode for utilizing the video carrier and including a resonant network for establishing said second electrode substantially at the reference potential in the frequency range of the sound carrier, and further circuit means connected to said third electrode for utilizing the sound carrier and including resonant network means for establishing said third electrode substantially at the reference potential in the frequency range of the video carrier, whereby said video amplifier performs the dual function of separating and amplifying both the video carrier and the sound carrier.

References Cited in the file of this patent

UNITED STATES PATENTS 2,853,603 Herold ---------------- Sept. 23, 1958